Figure 1:
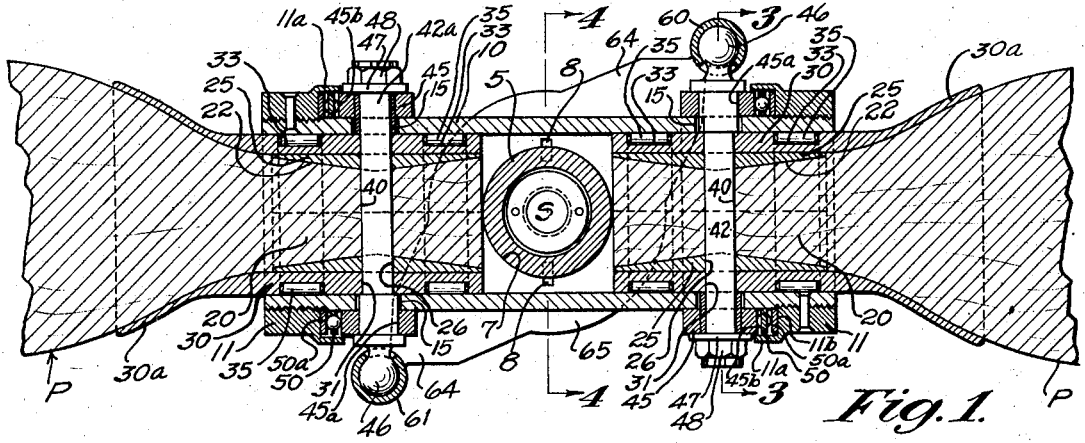

Feb. 8, 1944.     J. E. CAROL     2,341,207
VARIABLE PITCH PROPELLER
Filed Aug. 12, 1941     2 Sheets-Sheet 1

Inventor
James E. Carol.
Attorney.

Patented Feb. 8, 1944

2,341,207

UNITED STATES PATENT OFFICE 2,341,207

VARIABLE PITCH PROPELLER

James E. Carol, Los Angeles, Calif., assignor, by direct and mesne assignments, of sixty per cent to C. Bland Jamison, twenty per cent to Collins Mason, and twenty per cent to Arthur E. Wright, all of Beverly Hills, Calif.

Application August 12, 1941, Serial No. 406,489

6 Claims. (Cl. 170—163)

My invention relates to propellers and, more particularly, to variable pitch airplane propellers which may be manually operated from the cockpit during flight to vary the pitch angle of the blades.

It is among my objects to provide an efficient variable pitch propeller of such light weight and economical construction that it may be made available for general use on relatively small airplanes. I am aware that variable pitch propellers are known but those have been of a design and construction which have rendered them so costly and heavy that their use is prohibitive except upon large, powerful and expensive airplanes. One of the principal reasons why no successful variable pitch propeller has heretofore been produced to fill the need of small airplanes is the lack of a solution of the problem of how wooden propeller blades may be used in such devices without the blades being "thrown" by virtue of the great centrifugal forces attending operation. Another shortcoming of prior devices has been the practical difficulties of changing the pitch of the blades while in flight—that is, the tremendous centrifugal and other forces present in normal propeller operation have rendered the pitch changing means inoperable or impracticable. Furthermore, the arrangements and types of bearings utilized in such devices have proven incapable of withstanding the stresses and vibrations attending normal operation. A still further shortcoming of previous devices attempting the use of wooden blades has been the inability to provide shank ends of the blades of sufficient size to withstand the breaking moments without making the hub structure so large and heavy as to be impracticable.

It is to the overcoming of these and other fatal shortcomings of the prior art that my invention is primarily directed, and among its objects I aim to provide a variable pitch propeller which may be manually operated from the airplane cockpit during flight to vary the pitch angle of the blades; which successfully utilizes wooden blades without any danger of the blades being thrown in flight and without requiring an unduly large and heavy housing; which overcomes the difficulties heretofore experienced with thrust bearings; which is inexpensive to manufacture, durable, efficient and of relatively light weight.

Figure 2:
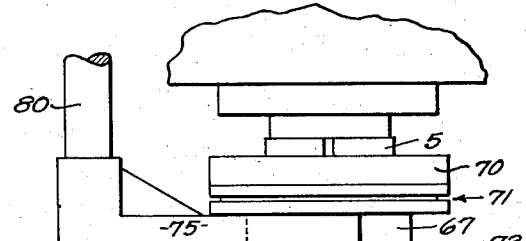
Figures 3, 4:
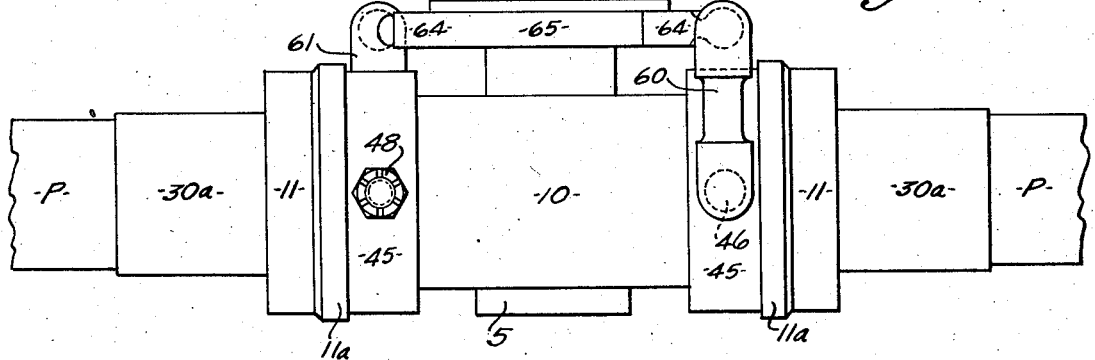
Figure 5:
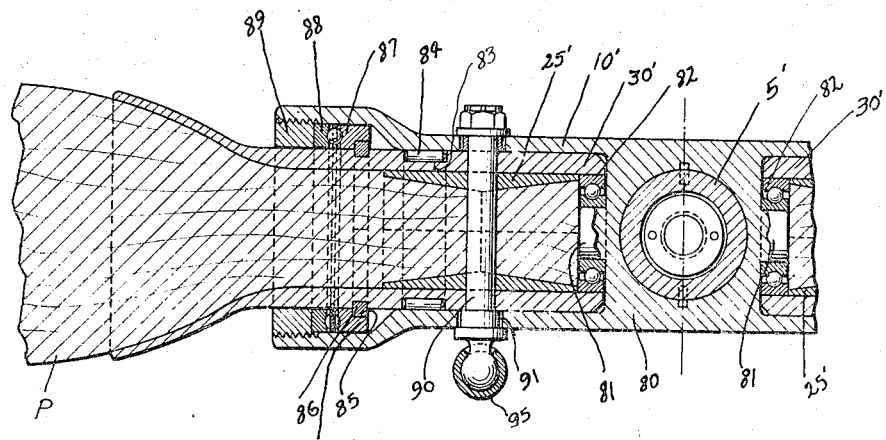

How the foregoing and still further objects are accomplished will become clear to those skilled in the art from the following detailed explanation of a presently preferred example of my invention, although of course it is to be understood that within its broader scope my invention may be carried out by utilizing other specific forms and adaptations. In the following description I shall refer to the accompanying drawings, in which:

Fig. 1 is a front view in longitudinal section;
Fig. 2 is a plan view;
Fig. 3 is a section on line 3—3 of Fig. 1;
Fig. 4 is a section on line 4—4 of Fig. 1, and
Fig. 5 is a longitudinal section showing a modification.

In the drawings, I show a hub unit including a spindle 5 and a tubular barrel 10 mounted radially on the spindle. The spindle has a bore and is secured longitudinally on the drive shaft S of a motor not shown, and extends transversely through the central holes 7 of the barrel, being splined thereto at 8. On each end of the barrel 10, I thread a collar 11, each of which collars has an inwardly projecting annular flange 11a to house the thrust bearing to be later described. Adjacent the inner end of each of the collars 11, I provide through the barrel a pair of diametrically opposite circumferentially disposed slots 15 for the purposes to be described.

In each end of the barrel 10, I mount the shank 20 of a wooden propeller blade P. I have said that a difficulty with previous attempts to utilize wooden blades in variable pitch mechanisms has been the inability of such structures to prevent throwing of the blades while in operation. I have successfully overcome this difficulty by utilizing, as an element of my combination, a feature shown in my copending application Serial Number 395,398. Each blade shank is provided with an annular recess 22 of V-shaped longitudinal section, and in this recess I mount a split sleeve 25 having an inner surface of V-shaped longitudinal section to conform to the recess in the shank, diametrically opposite holes 26 being provided through sleeve 25 in register with slots 15. A ferrule 30 houses each shank 20 with its carried sleeve 25 and each ferrule is provided with holes 31 in register with holes 26 and slots 15 to receive the operating pin to be later described. Annular bearing races 33 are provided in each ferrule, at opposite sides of holes 31, to take bearing rollers 35.

A hole 40 is provided through each blade shank 20, in registry with holes 26, 31 and slots 15, and through each of these holes I insert a cross pin 42, 42a, the ends of which project outwardly beyond the plane of the outer barrel surface and through holes 45a in rings 45 rotatably mounted on the barrel over the slots 15. At one end each of the pins 42, 42a has a spherical head 46 and carries a washer 47 and threaded nut 48 at its opposite end to secure the pin against longitudinal escape. Between the outer surface 45b of each ring 45 and the inner surface 11b of each collar 11, I provide an annular thrust bearing consisting of a ball-carrying ring 50 and an outer bearing race ring 50a. The flange 11a previously described overhangs this thrust bearing member.

Each ferrule 30 preferably has a flared outer end 30a which fits over the relatively enlarged portion of the blade adjacent the shank.

From the foregoing it will be observed that each blade shank 20, together with its carried sleeve 25 and ferrule 30 is rotatable about its longitudinal axis in the barrel to the extent of the length of the slots 15, the ends of the slots acting as stops for the cross pins 42, 42a.

For rotating the blades to vary their pitch angle, I provide links 60, 61, each of which is universally mounted at one end on the spherical end 46 of a cross pin and is likewise mounted at its opposite end on one of the two radially disposed arms 64 of a push plate 65. Plate 65 is secured on a sleeve 67 which is slidably mounted on spindle 5 and held against rotation with respect thereto by a key and keyway 68. Sleeve 67 has an annular flange 70, and a pair of spaced thrust bearings 71, 72 are mounted on the sleeve between the flange 70 and plate 65. A yoke 75 fits astride sleeve 67 between bearing members 71, 72 and a push rod 80 is secured at one end to the yoke and extends at its other end into the cockpit of the airplane so that it may be manually operated to vary the pitch angle of the blades. To change the blade pitch in one direction, yoke 75 is urged against bearing 72 to move plate 65, links 60, 61 and pins 42 forward, and to change the blade pitch in the opposite direction said parts are operated in the opposite direction.

From the foregoing it will be seen that the blade shank may be of relatively large diameter and yet the outside diameter of the barrel is relatively small because the thrust bearing is exterior of the barrel instead of being interposed between the shank and inner surface of the barrel. Furthermore, a maximum thrust bearing surface is provided, which is conducive to ease of operation. It is also impossible to "throw" a blade because pins 42, 42a extend medially through the shanks, sleeves 25 and ferrules 30, and even if centrifugal pull on the blades should tend to elongate the cross-section of the holes through the wooden shanks, the tapered inner surface of the sleeve, which sleeve is held against longitudinal movement by the cross pin, would compress the inner end of the shank to further strengthen the structure.

In the device of Fig. 5 I show a barrel or hub 10' disposed radially on the spindle 5', each end of the barrel having a longitudinal bore into each of which bores a blade shank carrying ferrule 30' is rotatably mounted, a tapered split sleeve 25' being interposed between the shank and ferrule as before described. The medial portion 80 of the barrel is solid and presents at each side a projection 81 on which is mounted a roller pilot bearing 82, the outer race member of which fits against the inner surface of the ferrule. The ferrule is provided with an annular race 83 carrying bearing rollers 84 and an annular recess 85 is also provided in each ferrule. A split ring 86 fits in recess 85 and is held therein by the overhanging portion 87a of inner thrust bearing race ring 87. The outer bearing race ring 88 is held against longitudinal movement by threaded ring 89, the barrel being of relatively increased diameter at and adjacent its outer ends to take the ring 89 and the thrust bearing members. A cross pin 90 extends through each end of the barrel as well as each ferrule, sleeve 25' and shank in the manner before described, and projects at its ends through circumferentially disposed slots 91, along which slots the pin moves to rotate the ferrule and its carried shank when pushed or pulled by the operating links 95. Links 95 are the same as links 60, 61 and are operated by the same means as before described.

While I have resorted to considerable detail in describing these particular adaptations, I have done so only to make my invention clearly understandable. Other modifications and adaptations may be made within the broader scope of my invention as defined by the following claims.

I claim:

1. A variable pitch propeller comprising in combination with a hub having a transverse bore adapted to receive a driven shaft and a tubular casing disposed radially of the bore, an annular thrust bearing encompassing the casing exterior, a blade having a shank mounted for rotation about its longitudinal axis in the casing, and means for rotating the blade including a projection extending radially from the shank and having bearing engagement with the thrust bearing.

2. A variable pitch propeller comprising in combination with a hub having a transverse bore adapted to receive a driven shaft and a tubular casing disposed radially of the bore, an annular thrust bearing encompassing the casing exterior, said bearing being rotatable circumferentially around the casing, a blade having a shank mounted for rotation about its longitudinal axis in the casing, and means for rotating the blade including a projection extending radially from the shank and having bearing engagement within the thrust bearing.

3. A variable pitch propeller comprising in combination with a hub having a transverse bore adapted to receive a driven shaft and a tubular casing disposed radially of the bore, an annular thrust bearing encompassing the casing exterior, a blade having a shank having a tapered annular surface, a longitudinally split sleeve encompassing and conforming to said annular surface, a ferrule constricting the sleeve about the shank, said ferrule being rotatably mounted in the casing, and means for rotating the ferrule relative to the casing whereby to rotate the blade, said means including a pin extending diametrically through the shank, sleeve, ferrule and casing and having bearing engagement at its outer end with the thrust bearing.

4. A variable pitch propeller comprising in combination with a hub having a transverse bore adapted to receive a driven shaft and a tubular casing disposed radially of the bore, an annular thrust bearing encompassing the casing exterior, a blade having a shank having a tapered annular surface, a longitudinally split sleeve encompassing and conforming to said annular surface, a ferrule constricting the sleeve about the shank, said ferrule being rotatably mounted in the casing, pin means projecting radially from the ferrule through the casing and having bearing engagement with the thrust bearing, and a pair of radial bearing members disposed between the ferrule and the interior surface of the casing, said radial bearings being disposed one on each side of the pin means.

5. A variable pitch propeller comprising in combination with a hub having a transverse bore adapted to receive a driven shaft and a tubular casing disposed radially of the bore, a ring threadedly mounted annularly of the casing exterior, said ring having a shoulder facing towards the inner end of the casing, an annular thrust bearing encompassing the casing exterior and rotatable against the shoulder, a blade having a shank mounted for rotation about its longitudinal axis in the casing whereby the casing is disposed between the shank and thrust bearing, a circumferentially disposed slot in the casing and means for rotating the shank including a projection extending radially from the shank through the slot and having bearing engagement with the thrust bearing.

6. A variable pitch propeller comprising in combination with a hub having a transverse bore adapted to receive a driven shaft and a tubular casing disposed radially of the bore, an annular thrust bearing encompassing the casing exterior, a circumferentially disposed slot in the casing, a ring rotatably mounted on the casing in position covering the slot, said ring having bearing engagement with the thrust bearing, a blade having a shank mounted for rotation about its longitudinal axis in the casing, and means for rotating the shank including a pin projecting radially from the shank through the slot and being secured at its outer end to the ring.

JAMES E. CAROL.